Figure 1:
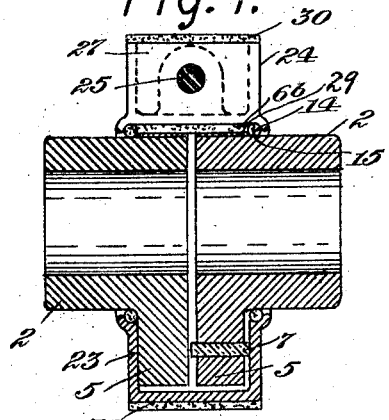

Oct. 30, 1928.

C. H. CLARK 1,689,861

FLEXIBLE COUPLING

Filed April 30, 1925

Inventor
Charles H. Clark,
by Wm. H. Babcock & Son
Att'ys.

Patented Oct. 30, 1928.

1,689,861

UNITED STATES PATENT OFFICE.

CHARLES HASKELL CLARK, OF NEW YORK, N. Y.

FLEXIBLE COUPLING.

Application filed April 30, 1925. Serial No. 27,010.

This invention relates to flexible couplings for coupling the ends of shafts together to turn about the same axis subject, of course, to end play and misalignment.

The main objects of this invention are; to provide a simplified type of flexible coupling which can be constructed of inexpensive cast parts; to provide a coupling in which the operative faces of the hubs or their radially outer faces will be each in a single plane and so presented as to be capable of machining with great accuracy and speed and a minimum of expense; to provide for electrically insulating the hubs from each other; to provide in such a coupling pockets for retaining oil or grease for lubricating the surfaces of the coupling members subject to friction; to provide in a flexible shaft coupling a housing or transmission element so designed and mounted that, even though it be inflexible in all directions, it will float and thus freely permit radial flexibility and end play; to provide a type of floating housing or transmission element which can be adjusted to suit the amount of radial flexibility desired or to compensate for wear; to provide a coupling which can be applied to the aligned shafts without need for axial movement thereof; to provide a coupling housing or transmission element which can be applied to the hubs after they have been fixed to the shafts; to provide means for disconnecting said hubs to allow one shaft to turn independently of the other; to provide a simple dust proof covering; to provide a housing which can be easily balanced and will therefore be free from noise and vibration at high speeds; and to provide a cushioning liner, which, for certain uses or conditions, may be metal faced, all of which objects, among others, are accomplished by the combination, construction and arrangement of parts hereinafter more particularly set forth, described and claimed.

In practice it is found a great advantage in manufacture, in assembly, and in actual operative conditions, to have the operative portions of the hubs triangular in shape so as to present three long plane operative faces equi-distantly spaced about the axis of the hubs in the form of a triangle, as it is an easy matter to machine the operative faces and make them accurate, one in relation to the other, with speed and economy, also one straight liner covers two operative surfaces of the transmission element or housing and of the two hubs. Further, such a triangularly shaped coupling hub can be held in a three jaw chuck and be instantly centered so that there is no delay in the machining of it, and in use the radially separable three plate transmission element or housing can be very quickly and simply applied to the two flanges of the coupling hubs.

In the accompanying drawings, in which I have shown several embodiments of my invention, broadly considered, to illustrate the practice of my invention, but with no desire to be understood as confining myself thereto and no wish to be limited thereto, it being recognized by me that the invention may be embodied in a great variety of other forms in addition to those illustrated.

Figure 2:
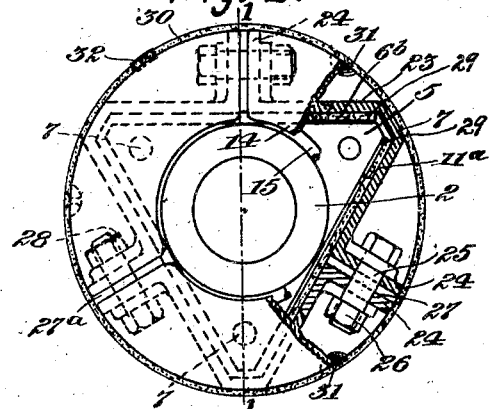
Figure 3:
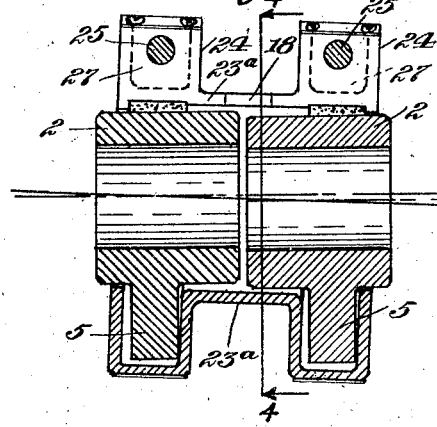
Figure 4:
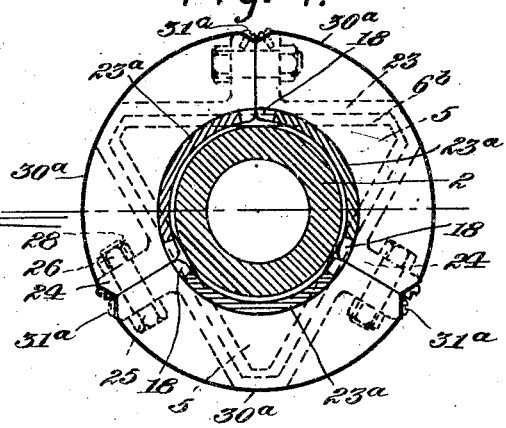
Figure 5:
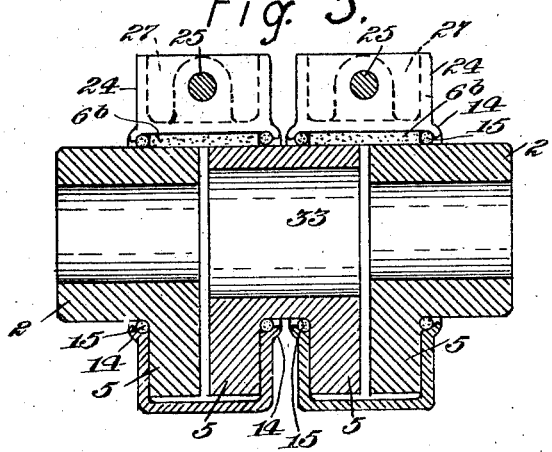
Figure 6:
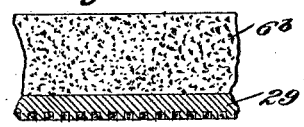

Figure 1 represents a longitudinal sectional view on line 1—1 of Fig. 2 through a coupling embodying my invention and having a three part radially split housing or transmission element and endless belt leather covering band;

Figure 2, an end view, partially broken away and in section thereof;

Figure 3, a view, similar to Fig. 1, of a modification of the type shown in Fig. 1, being adapted for use where there is appreciable misalignment;

Figure 4, a sectional view on the line 4—4 of Fig. 3, looking in the direction of the arrows;

Fig. 5, a view, similar to Fig. 1, of a further modification of the type shown in Fig. 1, being adapted for use where there is excessive misalignment; and Figure 6, a greatly exaggerated enlarged transverse sectional view of the metal faced leather liner preferably used in all forms illustrated, the metal facing of the liners being presented toward the operative faces of the respective hubs and, when for use in a coupling where the heat is excessive, having their sides so presented toward said working faces longitudinally grooved and filled with graphite.

Referring now in detail to the drawings, two hubs 2 having triangular flanges 5 are employed, and one of these flanges 5 may be provided with spacing electrically insulating fibre blocks or plugs 7 as illustrated. In this embodiment, I employ a three part radially separable and adjustable housing or transmission element consisting of three sections 23, preferably identical in size, shape, weight and material, each being interchangeable with either of the others, each constituting a pointed or triangular boot or pocket having its ends, sides and radially outer end or tip unbroken in area or closed, and each fitting over, straddling or spanning and enclosing one of the three pair of axially aligned points or teeth of the hubs 5, the side walls 11ª of each of said sections, boots, or pockets 23 being adapted to have driving engagement with the metal faced leather liners 6ᵇ, the metal plates 29 of which are presented toward, in engagement with, and span, the respective pairs of operative faces of the triangular flanges 5 and rest thereagainst, and the faces of the metal plates 29 presented toward the operative radially outer faces of the flanges 5 may be longitudinally grooved and filled with graphite to be self-lubricating, as illustrated in Figure 6, though this is not essential, but is of particular advantage where the coupling is to be used under conditions of excessive heat.

Each of said sections 23 of the housing or transmission element have radially extending perforated walls 24 to receive the respective bolts 25, which extend through and fit snugly in the registering perforations in the adjacent registering perforations in the adjacent registering radially extending walls 24 of the adjacent similar sized and shaped sections, boots or pockets 23, a nut 26 being applied to each bolt 25 as usual. There are, in the embodiment illustrated, three bolts 25 to respectively secure together each pair of the three pairs of radial walls 24 so that by said walls, which are preferably integral with their respective sections or boots 23, the said boots or sections 23 will be connected together in an endless band or housing, so that each of the three pairs of points or teeth of the hubs 5 will be connected together and connected with each of the other pairs of points or teeth of said hubs 5 to transmit motion from one of the hubs to the other.

The sections, pockets or boots 23 may be bolted tightly together, but it is preferable to leave an interval or clearance 27ª between the opposed faces 27 of each pair of radial walls 24 so as to permit adjustment of the housing sections or boots 23 toward or from each other to suit the amount of radial flexibility desired and to compensate for liner or other wear, or for liner thickness.

After the bolts 25 have been adjusted as desired, cotter pins 28 may be inserted in perforations extending through their screw-threaded portions respectively, and have their respective points spread as usual.

The liners 6ᵇ employed in this embodiment are three in number, one for each side of the triangle defined by the operative radially outer faces of the flanges 5 of the hubs 2, instead of being continuous.

In this form or embodiment the boots, pockets or sections 23 will usually be filled with oil or grease to keep all working surfaces of the hubs, housing sections 23 and metal facings thoroughly lubricated, and the housing sections 23 may have their radially inner end edges formed with a grooved annular lip or flange 14, the grooves thereof of all of said sections being aligned on each end of the housing to receive a packing cord or ring 15 to render the housing as a whole grease tight and dust proof. However, this is not essential.

To protect the coupling to a large degree against the ingress of dust I provide a band covering 30 which may be of leather, which will preferably be of a width corresponding to the distance between the outer faces of the outer end walls of the sections, boots or pockets 23, which will preferably be provided with wooden retainer blocks 31 on its inner side snugly fitting between the opposed faces of the end walls of said sections 23 to keep the band or covering from shifting axially out of position, and which will have its adjacent ends connected by any usual belt or band lacing or coupling means 32 such as now in common use for this and similar purposes.

In order to guard all parts, reinforce the radial walls 24, and reinforce each section 23 as a whole, its end walls will preferably extend unbrokenly on the arc of a circle for approximately 120 degrees of the circle of such arc, and all walls and portions of each such section or boot 23 will preferably all be integral with each other, such construction lending itself especially to production by casting.

In the modification illustrated in Figures 3 and 4 I have shown a three part radially separable and adjustable housing or transmission element consisting of three relatively long sections 23ª having each two pockets, one adjacent each end to each fit over but one tooth or point of a flange 5 of a single hub 2, so that the centers of the operative faces of the two hubs 2 will be at a considerable interval from each other, this form being intended for use where there is an appreciable misalignment. Each section 23ª is notched midway between its pockets to provide sight openings 18 so that the approximate degree of misalignment of the shafts may be seen at a glance.

The grooved lips 14 and packing cord 15 are omitted from this form.

Instead of using the leather covering 30 in this modification I provide a similar, but sheet metal, covering in three sections 30ª secured to the radially outer edges of the walls 24 by means of screws 31ª.

Otherwise, the construction and operation of this modified form are the same as in the form illustrated in Figures 1 and 2.

In the modified form illustrated in Figure 5 I have shown an embodiment of my invention designed for use where the radial misalignment is excessive, a floating transmission element or double hub 33 being placed between the hubs 2 and held in position by two separate housings or transmission elements, each consisting of the parts, and assembled, as described with relation to, and illustrated in, Figures 1 and 2, and each secured about the three teeth or points of the flange 5 on one of the ends of double hub 33 and the three teeth or points of the flange 5 of the adjacent hub 2. In this embodiment the leather covering band 30 is omitted. Otherwise, the construction and operation of this modified form are in all respects the same as in the form illustrated in Figures 1 and 2.

In the forms illustrated, radial flexibility is controlled by means of the bolts 24, being proportionately lessened as the housing is more tightly cinched. When the housing is cinched very tightly the coupling can be used on a three bearing outfit.

Perfect balancing of the housing may be obtained by the selection of equal weight housing sections 23 to form the housing, thus ensuring freedom from noise and vibration at high speeds.

Leather as a cushioning transmission element is known to possess many advantages, but its use is usually associated with backlash or with a lack of a sufficient amount of flexibility. In the present invention the adjustable housing eliminates all backlash and thus permits the leather liners to function to their best advantage. These leather liners in the present invention provide a small amount of radial, angular and tangential flexibility, but the greater amount of flexibility is supplied by the floating of the housing or transmisson element as a whole, which functions like a dummy shaft, as above explained. Axial flexibility or end play is also obtained and enhanced by the use of the metal facing on the liners, the bearing or operative faces, thereof being thoroughly lubricated by grease or oil contained in the housing as above explained.

Having thus described my invention, what I claim as new and desire to secure by Letters Patent is:

1. A coupling having hub members adapted to be suitably mounted upon shafts to be coupled, said members having radially extending projections, in combination with a radially adjustable floating endless band housing for connecting said projections together in an axial direction, said housing comprising a plurality of sections and means for adjustably connecting said sections together whereby said projections will be connected circumferentially, said adjustable connecting means permitting the housing as a whole to be radially expanded or contracted with relation to the axis of said hubs to control the degree of radial flexibility of the coupling as a unit, said housing having walls presented toward the respective projections of said hubs.

2. A coupling having two hub members adapted to be suitably mounted upon shafts to be coupled, said members having radially extending projections, in combination with a floating housing comprising a plurality of rigid plates and means extending between said plates for adjustably connecting them in an endless band, said plates being adapted for radial adjustment about said projections and having operative faces presented in operative relation to said hubs, whereby rotary movement of either of said hubs or of said housing will involve the corresponding rotary movement of the other two of said elements.

3. A coupling having hub members adapted to be mounted upon shafts to be coupled, said members having radial projections, the projections of one hub member being adapted to substantially register, in an axial direction, with the projections of the other hub member, in combination with a sectional plate housing adapted to enclose the same against the ingress of dust or foreign matter and against the egress of lubricant and having walls adapted to be engaged by said projections to transmit motion from one hub to the other, and means for covering the joints between the sections of the housing to prevent the entry of dust and foreign matter without interfering with the adjustment or operation of said housing.

In testimony whereof I have signed my name to this specification at New York, New York, this 29th day of April, 1925.

CHARLES HASKELL CLARK.